Dec. 13, 1949        I. SORDI        2,490,843
VISE-JAW ATTACHMENT SELECTIVELY USABLE AS
AN AUXILIARY JAW OR AS A WORK SUPPORT
BETWEEN TWO OTHER VISE JAWS

Filed May 17, 1946        3 Sheets-Sheet 1

INVENTOR.
ILIO SORDI
BY
M. Hayes
ATTORNEY

Dec. 13, 1949     I. SORDI     2,490,843
VISE-JAW ATTACHMENT SELECTIVELY USABLE AS
AN AUXILIARY JAW OR AS A WORK SUPPORT
BETWEEN TWO OTHER VISE JAWS

Filed May 17, 1946     3 Sheets-Sheet 2

INVENTOR.
ILIO SORDI
BY
M. O. Hayes
ATTORNEY

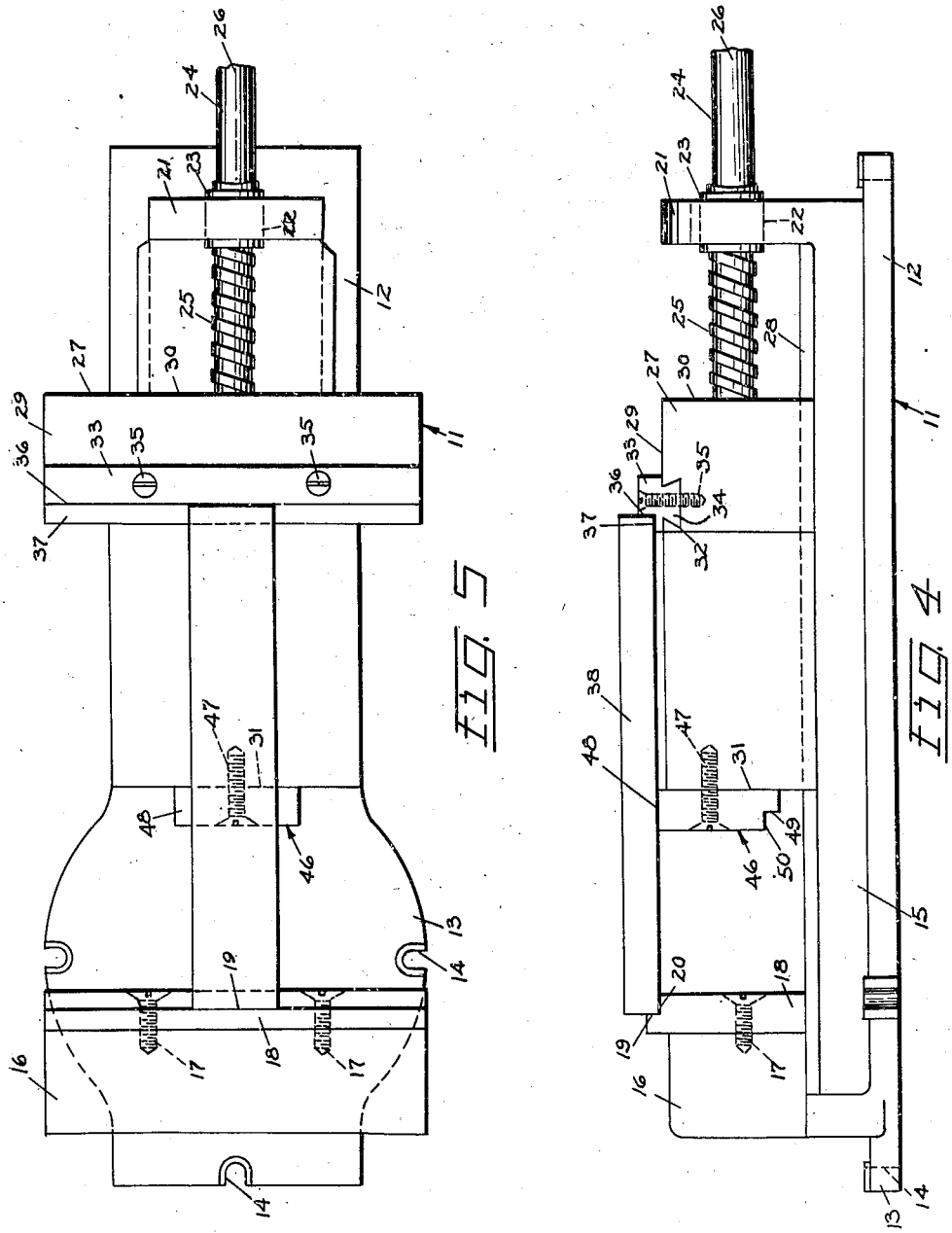

Patented Dec. 13, 1949

2,490,843

UNITED STATES PATENT OFFICE 2,490,843

VISE-JAW ATTACHMENT SELECTIVELY USABLE AS AN AUXILIARY JAW OR AS A WORK SUPPORT BETWEEN TWO OTHER VISE JAWS

Ilio Sordi, New York, N. Y.

Application May 17, 1946, Serial No. 670,405

2 Claims. (Cl. 81—38)

(Granted under the act of March 3, 1883, as amended April 30, 1928; 370 O. G. 757)

The present invention concerns a vise having a pair of jaws for clamping a piece of work and also having a member between said jaws that can serve as a support for work clamped between the jaws or can be adjusted to serve as an alternate jaw.

Another object is to provide a vise having a fixed jaw and a pair of alternate movable jaws whereby selection of the movable jaw to be used for clamping a particular piece of work can be made consistent with the size of the piece of work.

Another object is to provide a vise having a fixed jaw and a movable head provided with a jaw and supporting a member between the jaws which can serve as a support for relatively large pieces of work clamped between the jaws or can be adjusted to serve as an alternate jaw for clamping relatively small pieces of work against the fixed jaw.

Further objects and advantages of this invention, as well as its construction, arrangement and operation, are apparent from the following description and claims in connection with the accompanying drawings, in which:

Fig. 3 is a side elevational view of the form of the invention shown in Fig. 1 but with the vise conditioned to hold a relatively small piece of work and with the member between the jaws adjusted to serve as an alternate jaw;

Fig. 4 is a view similar to Fig. 1 showing a modification of the invention; and, Fig. 5 is a view similar to Fig. 2 showing the modified form of invention seen in Fig. 4.

Figure 1:
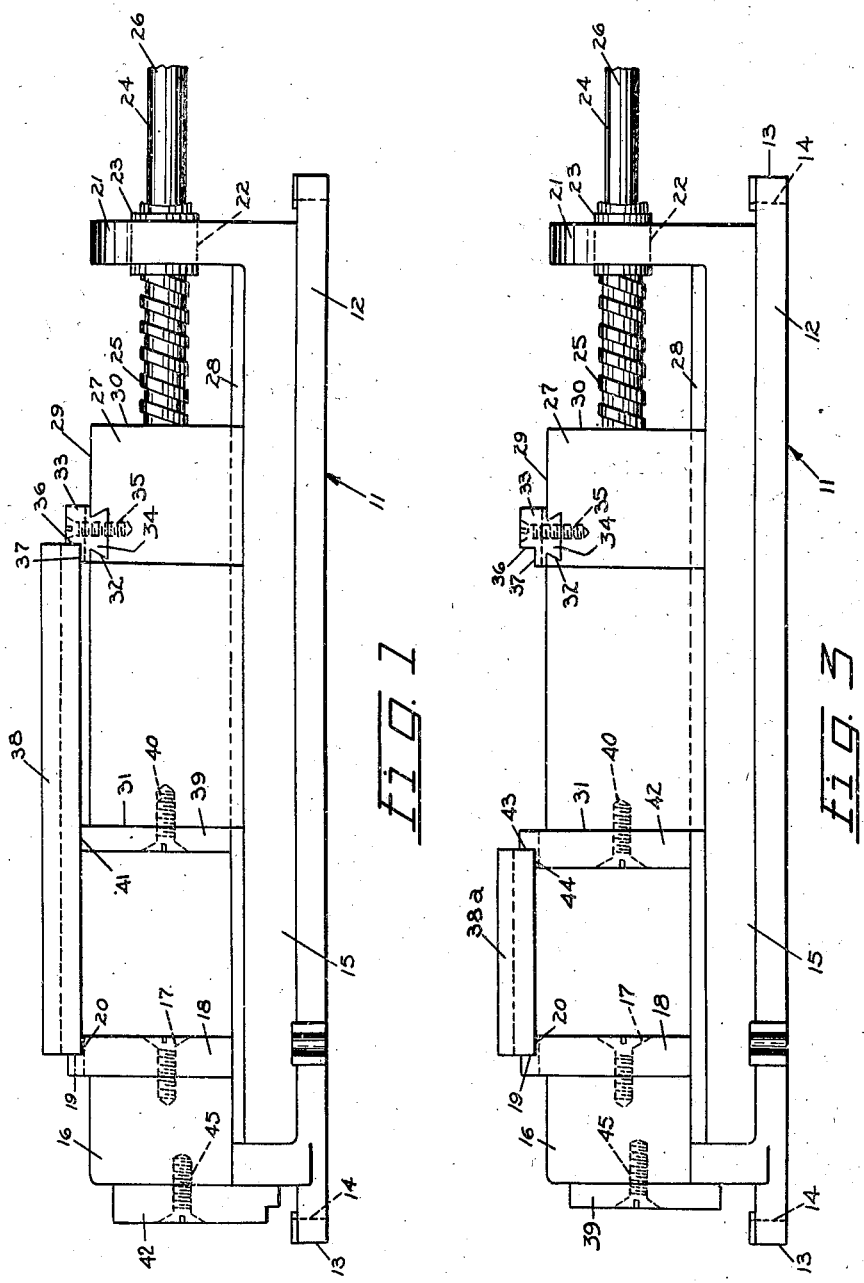
Fig. 1 is a side elevational view of a preferred form of the invention with the vise conditioned to hold a relatively large piece of work and with the member between the jaws adjusted to serve as a work support.
Figure 2:
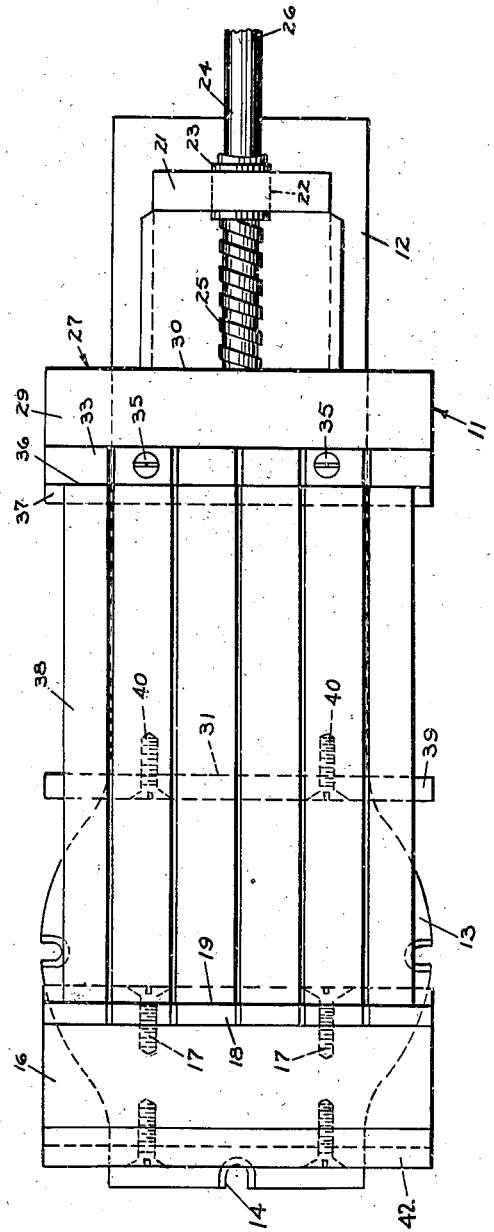
Fig. 2 is a top plan view of the construction shown in Fig. 1.

There is shown in Figs. 1–3 a vise 11 suitable for holding a workpiece for gang milling or slicing operations including a frame 12 that is a relatively large and heavy member having an anchor flange 13 by which the vise can be secured to any suitable support. Flange 13 is provided with peripheral slots 14 for receiving suitable anchoring members. Disposed above frame 12 is an elongated body 15 upon which is mounted transversely at one end a fixed jaw block 16. Secured to jaw block 16 by screws 17 is a jaw 18 comprising an elongated member extending transversely of body 15 and having formed at its upper end work-gripping surfaces 19 and 20. Jaw 18 is so dimensioned that gripping surfaces 19 and 20 extend above block 16 as shown in Fig. 1.

Offset upwardly at the opposite end of body 15 is a vertical flange 21 disposed transversely of body 15. Formed in flange 21 is a bore 22 into which a collar 23 is friction fitted. Mounted for turning movement in collar 23 is a rod 24 having external threads 25. One extremity 26 of rod 24 can be engaged by any suitable mechanism to effect turning of rod 24 within flange 21. The other extremity of rod 24 is threaded into the end of a movable head 27 that is mounted for sliding movement on sliding ways 28 formed in the upper surface of frame 15. Movable head 27 is an elongated member extending longitudinally above frame 15 and having a top surface 29 and end surfaces 30 and 31.

Formed in the upper surface of movable head 27 is a dovetail slot 32 extending transversely across the entire width of movable head 27. Fitted into dovetail slot 32 is a jaw that has its lower end offset to form a dovetail 34 designed to mate in slot 32 in movable head 27. Screws 35 lock jaw 33 relative to movable head 27. The upper surface of jaw 33 is offset to form work-gripping surfaces 36 and 37, substantially similar to gripping surfaces 19 and 20, respectively, of jaw 18 and jaws 18 and 33 are arranged in opposed relation so that a piece of work 38 can be clamped therebetween.

Detachably mounted on end 31 of movable head 27 is a support 39 secured in place by means of screws 40. Support 39 extends transversely of frame 15 and is provided with a work-supporting surface 41 at the top thereof. Work-supporting surface 41 is disposed in the same plane as gripping surface 20 of fixed jaw 18 and gripping surface 37 of jaw 33. Thus, work-supporting surface 41 is flush with the bottom surface of workpiece 38 and serves to support workpiece 38 against sagging between jaws 18 and 33.

In Fig. 3 is shown the construction illustrated in Fig. 1 with modifications presently to be described whereby vise 11 is arranged to clamp a relatively small piece of work 38a. Parts in Fig. 3 that are identical with those in Fig. 1 are indicated by identical reference characters.

In Fig. 3, support 39 is removed and replaced by jaw 42 that is secured in place against end 31 of movable head 27 by means of screws 40. Jaw 42 is similar to jaw 18 and is provided at its upper end with work-gripping surfaces 43 and 44 that are in opposed relation to work-gripping surfaces 19 and 20 of jaw 18. The relatively small piece of work 38a is clamped between jaws 18 and 42.

Support 39 of Fig. 1 and jaw 42 of Fig. 3 are used alternately depending on the size of the work piece to be clamped in vise 11. When not in use, jaw 42 can be stowed on fixed jaw block 16 by means of screws 45 as seen in Fig. 1 and support 39 when not in use can be stowed upon fixed jaw block 16 by means of screws 45 as seen in Fig. 3.

Figs. 4 and 5 show a modification of the form of invention illustrated in Figs. 1 to 3. Parts that are identical with those shown in Figs. 1 to 3 are given identical reference characters. Mounted on face 31 of movable head 27 is a work-engaging member 46 mounted for rotary movement upon a screw 47. One end of member 46 is formed to provide a work-supporting surface 48 and the opposite end of member 46 is formed to provide work-gripping surfaces 49 and 50. With member 46 in the position disclosed in Fig. 4, surface 48 is disposed in a position to support workpiece 38. Member 46 can be inverted to bring gripping surfaces 49 and 50 into a position to clamp a work-piece against fixed jaw 18.

Operation of the device is as follows. When it is desired to clamp a relatively large piece of work in vise 11 in the manner indicated in Figs. 1 and 2, rod 24 is rotated to cause threads 25 thereon to effect sliding of movable head 27 along sliding ways 28 until jaw 33 is withdrawn a distance from fixed jaw 18 that corresponds approximately with the length of the piece of work that it is desired to clamp. Member 39 is then secured to face 31 of movable head 27 by means of screws 40 so that surface 41 thereof is suitably disposed between jaws 33 and 18 in a position to support the piece of work. A workpiece 38 is then laid upon surfaces 20 and 37, respectively, of jaws 18 and 33 in which position work piece 38 rests upon work supporting surface 41. Rod 24 is then rotated to cause threads 25 thereof to move sliding block 27 on sliding ways 28 toward fixed jaw 18 until workpiece 38 is gripped securely between surfaces 19 and 36, respectively, of jaws 18 and 33.

When it is desired to clamp a relatively small piece of work in vise 11 as shown in Fig. 3, support 39 is removed from face 31 of movable head 27 and is replaced by jaw 42. Rod 24 is rotated to cause threads 25 thereof to effect sliding of movable head 27 on sliding ways 28 until the distance between jaws 18 and 42 is approximately correct for accommodating a workpiece 38a which is then laid upon work gripping surfaces 20 and 44 of jaws 18 and 42, respectively, and rod 24 is turned to cause movable head 27 to slide on sliding ways 28 until work piece 38a is securely gripped between surfaces 19 and 43 of jaws 18 and 42, respectively.

In the form of invention shown in Figs. 4 and 5, the operation is similar to that described in Figs. 1 to 3 except that a single work-engaging member 46 is used and can be rotated about supporting screw 47 to bring surface 48 into operative position for supporting a relatively long piece of work or to alternately bring gripping surfaces 49 and 50 into operative position for clamping a relatively short piece of work.

It is to be understood that various modifications and changes can be made in this invention without departing from the scope thereof as set forth by the appended claims.

The invention described herein may be manufactured and used by or for the Government of the United States of America for governmental purposes without the payment of royalties thereon or therefor.

What is claimed is:

1. A vise including a frame, a first jaw fixedly mounted on said frame and having a work-gripping transverse notch in an upper corner, a head mounted on said frame for movement along a path toward and away from the first jaw and having an end surface parallel to said first jaw and having also a top surface lying in a plane spaced below said first-jaw notch, a second jaw fixedly mounted on said head in a location remote from the end surface of said head and having a transverse notch spaced above said top surface and confronting said first-jaw notch, an attachment having a work-gripping portion formed by a transverse notch and a work-supporting portion formed by a plane surface, and means for mounting the attachment on said end surface of said head for rotation about an axis substantially parallel to said path of movement, the distance between said axis and each of said attachment portions being greater than the distance between said axis and said head top surface; said attachment being thereby selectively rotatable either into a first position; in which its work-gripping notch cooperates with the first-jaw notch to grip a workpiece therebetween; or into a second position, in which its work-supporting plane surface projects above the head top surface to provide an intermediate support for a workpiece gripped between the notches of the first and second jaws.

2. A vise including a frame, a first jaw fixedly mounted on said frame and having a work-gripping transverse notch in an upper corner, a head mounted on said frame for movement along a path toward and away from the first jaw and having an end surface parallel to said first jaw and having also a top surface lying in a plane spaced below said first-jaw notch, a second jaw fixedly mounted on said head in a location remote from the end surface of said head and having a transverse notch spaced above said top surface and confronting said first-jaw notch, an attachment having a work-gripping portion formed by a transverse notch and a work-supporting portion formed by a plane surface, and means for mounting the attachment on said end surface of said head for rotation about an axis to move said attachment portions toward and away from said head top surface, the distance between said axis and each of said attachment portions being greater than the distance between said axis and said head top surface; said attachment being thereby selectively rotatable either into a first position; in which its work-gripping notch cooperates with the first-jaw notch to grip a workpiece therebetween; or into a second position, in which its work-supporting plane surface projects above the head top surface to provide an intermediate support for a workpiece gripped between the notches of the first and second jaws.

ILIO SORDI.

REFERENCES CITED

The following references are of record in the file of this patent:

UNITED STATES PATENTS

| Number | Name | Date |
| --- | --- | --- |
| 1,011,108 | Bowman | Dec. 5, 1911 |
| 1,163,145 | Gross | Dec. 7, 1915 |
| 1,242,182 | Hallas | Oct. 9, 1917 |
| 1,425,275 | Paulsen | Aug. 8, 1922 |
| 2,333,114 | Meyer | Nov. 2, 1943 |